Jan. 8, 1935.  J. C. MOORE  1,987,244
MATURITY TESTER
Filed May 31, 1932
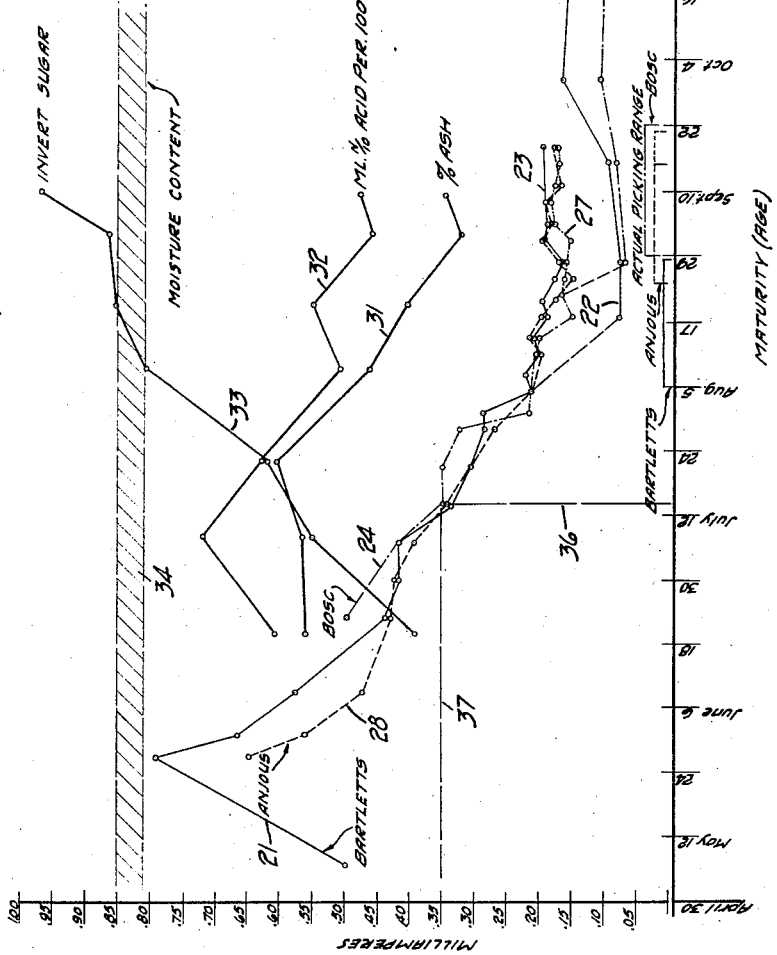
INVENTOR.
J. C. MOORE
BY
ATTORNEYS.

Patented Jan. 8, 1935

1,987,244

UNITED STATES PATENT OFFICE 1,987,244

MATURITY TESTER

James C. Moore, Corvallis, Oreg., assignor to Southern Oregon Sales, Inc., Medford, Oreg., a corporation of Oregon Application May 31, 1932, Serial No. 614,453

8 Claims. (Cl. 175—183)

My invention relates to a means for determining the physio-chemical condition or development of an article by means other than the usual empirical determination by inspection and the like. Such means is of particular value in ascertaining the maturity or apparent age of fruit.

Using pears as an example, it has been found that if such fruit is picked from the trees when it has attained a certain critical state of development, that is, a certain maturity, it not only can be handled with less damage and with less likelihood of loss in the packing operations, but it also keeps better in storage and presents a better ultimate appearance and has better ultimate characteristics. Heretofore it has been a difficult matter to determine with any degree of certainty such critical periods in the life cycle of fruit, such as pears for example, and it is therefore an object of my invention to provide a method of determining with considerable accuracy the maturity of organic articles.

The foregoing and other objects are attained in the embodiment of the invention shown in the drawing, in which Figure 1 is a graphical chart showing thereon various curves which have been developed in accordance with my invention.

Figure 2 is a plan showing in partially diagrammatic form an apparatus useful in conducting the method of my invention.

In its preferred form, the method of my invention comprises the steps first of measuring an electrical characteristic such as the conductivity of the article to be tested, and secondly of converting the results of such measurement into "condition units" or "age units" primarily by means of a graphical curve indicating known relationships between such electrical characteristic and physiochemical conditions or maturity.

Although my invention is by no means limited to use in conjunction with fruit or in conjunction with pears specifically, inasmuch as it has been utilized for determining the condition of milk, that is, the "maturity" of milk for optimum results in churning, and for growth measurements of bacteria cultures, etc., I have chosen to exemplify it herein in conjunction with the maturity determination of an article such as a pear. Furthermore, inasmuch as there is some variation in the maturity times of different kinds of pears, I shall explain my method with three different kinds of pears.

In accordance with my invention, I have found that there is a definite correspondence between the electrical resistance or conductivity of the flesh of a pear and the maturity or physio-chemical condition of the pear. I therefore use an apparatus for determining the specific electrical resistance or conductivity of the article to be tested. To this end, there is shown in Figure 2 a suitable mechanism, including a handle 6, provided with a piercing prong 7 which is included in a circuit by means of a conductor 8. The handle is likewise provided with a piercing prong 9 included in a circuit by means of a conductor 11. The conductor 8 is connected usually to a milliammeter which is likewise joined by a lead 12 to a source of electromotive force such as a battery 13. The other conductor 11 is joined to a rheostat 14 interposed between the conductor 11 and the battery 13.

In the use of this mechanism, the rheostat is adjusted to give a standard potential or voltage across the piercing prongs 7 and 9 as indicated by a voltmeter 16. The prongs are inserted into the flesh of a fruit a definite distance inasmuch as entry is limited by the handle 6 and inasmuch as the prongs have a fixed spacing, and since a fixed area of each of them is in contact with the flesh of the fruit, standard conditions obtain. This specific electrical resistance can easily be determined from the reading of the milliammeter or on the other hand, the specific electrical conductivity of the sample being tested can be determined from the milliammeter reading.

It is of little moment in what units the reading of the milliammeter is taken. In the present instance, and as particularly shown in Figure 1, I have plotted a graphical curve on the basis of the milliammeter readings in milliamperes at 3 volts as abscissæ and the maturity or age of the fruit in days as the ordinates. As indicated by this graph, the curve 21 is for Bartlett pears and shows that when the initial test was made between April 30th and May 12th with the fruit still on the tree, the milliammeter gave a reading of 50 milliamperes. It is further shown that this reading was nearly 80 milliamperes toward the end of May, and that subsequently, the reading in milliamperes decreased in accordance with a smooth curve until just prior to August 5th.

At this time, some of the fruit was picked and was placed in storage, as indicated by the line 22. The first reading thereafter was taken with the stored fruit about the 17th of August. Some of the fruit still remaining on the trees and not picked or placed in storage gave rise to readings indicated by the line 23. Since this line is approximately horizontal, it indicates that very little change is taking place within these Bartlett pears.

Although as shown by the line 22 the milliampere values at first decrease considerably, they gradually increase as time goes on and as the fruit becomes more mature or of a greater age, until from about October 4th on, the line 22 is substantially a continuation of the line 23. This indicates that the picking operation reduces considerably the conductivity of the fruit or increases its resistance, but that ultimately the resistance or conductivity are substantially the same as they would have been had the stored fruit not been picked and placed in storage. It is concluded that at the time of picking, as indicated by the substantial straightening out or flattening of the curve 21, the fruit was in an optimum condition for picking and was suitably matured. This condition I demonstrated by exhaustive storage and ripening tests.

Approximately the same thing can be observed from the line 24 indicating similar conditions with respect to the Bosc variety of pears which were picked somewhat later and were placed in storage as indicated by the line 26, while other fruit of the Bosc variety, which was permitted to remain on the trees, had a conductivity indication represented by the line 27. Additionally, the line 28 indicates a maturity characteristic of pears of the Anjou variety and checks very closely with the characteristic for pears of the Bartlett and Bosc varieties.

To show other factors of interest in considering the described curves, I have included a curve 31 which shows the amount of ash in the fruit juice at succeeding time intervals, expressed as a percentage, which is readable on the scale of abscissæ with a dividing factor of one. Also, I have included a curve 32 which shows the number of milliliters of N/10 acid in 100 milliliters of juice as the fruit matures and can be quantitatively read from the scale of abscissæ with a dividing factor of one hundred. In addition, there is included a curve 33 showing the amount of invert sugar in juice of the fruit expressed as a percentage and readable from the scale of abscissæ with a dividing factor of ten.

The moisture content of the fruit throughout the time period of maturing, is virtually constant and is represented by the shaded band 34 which defines the region within which the moisture content fluctuates. The quantity of moisture can be read as a percentage from the scale of abscissæ with a dividing factor of one.

Since the graphical curve described shows the known relationship between the specific electrical conductivity as expressed in milliampere units and the condition or maturity of the kind of material being tested, the reading of the milliammeter can easily be transferred into physiochemical or maturity units. By means of the graph, there can at any time be determined a known conversion factor for any particular reading in milliamperes to convert such reading in milliamperes into a reading in condition units or maturity units. For instance, as shown in Figure 1, it is indicated by the line 36, representing the length of an abscissa, that if the milliammeter reading is 35 milliamperes, then the maturity or apparent age of the fruit is such that the distance between the line 36 and the line marking the beginning of the actual picking range, as indicated on the graph, is a measure of the time that must elapse before the fruit can be harvested for the best results. For the Bosc variety, for instance, the distance between the line 36 and the line marking the beginning of the actual picking range for this variety is equivalent to approximately six weeks. This is based upon and coincides with past experience. The conversion or dividing factor for expressing this milliammeter reading in terms of number of weeks to harvest time for the Bosc variety, i. e. when the milliammeter reading is 35 milliamperes, is consequently $$\frac{35}{6}$$

or approximately 6. For this material when the reading in milliamperes is 35, the conversion factor is 6. Dividing milliamperes by six gives the probable time to elapse before harvest in weeks.

By following the described method, the apparent age or maturity of various different articles or substances can be determined, and it is fully to be understood that the described examples herein, namely, of three different kinds of pears, are given solely to illustrate the manner of practicing my invention.

I claim:

1. The method of determining the degree of ripening of fruit comprising the steps of measuring the specific electrical resistance of the fruit to be tested, and comparing such measurement with known data representative of the relationship between the specific electrical resistance and the previously known degree of ripening of the same kind of fruit.

2. The method of determining the maturity of fruit comprising the steps of measuring in milliampere units the specific electrical conductivity of the fruit to be tested, and comparing such measurement with a known graphical curve the abscissæ of which represent age of the same kind of fruit and the ordinates of which represent specific electrical conductivity in milliampere units.

3. The method of determining the maturity of fruit and the like comprising the steps of measuring in electrical units the specific electrical conductivity of the fruit to be tested, and converting such measurement into maturity units by means of a known graphical curve representative of the relationship between electrical conductivity and maturity.

4. The method of determining the maturity of fruit and the like comprising the steps of measuring in electrical units the specific electrical conductivity of the fruit to be tested, and multiplying such measurement by a known conversion factor to express said measurement in maturity units.

5. The method of determining the maturity of fruit and the like comprising the steps of actuating an electrical indicator in accordance with an electrical characteristic of the article, and interpreting the actuation of said indicator in terms of maturity.

6. The method of determining the apparent age of fruit and the like comprising the steps of determining the value of an electrical characteristic of the fruit, and converting the value into a value of apparent age by means of a known relationship between electrical characteristic values and apparent age values.

7. The method of determining the maturity of fruit and the like comprising the steps of measuring the specific electrical conductivity of the fruit during and without interrupting the life cycle thereof, and evaluating such measurement in terms of maturity in accordance with a known relationship between specific electrical conductivity and maturity.

8. The method of determining the maturity of fruit and the like comprising indicating the electrical conductivity of the fruit without interrupting the life cycle thereof, and evaluating such indication in terms of maturity.

JAMES C. MOORE.